United States Patent [19]
Duske

[11] Patent Number: 5,525,239
[45] Date of Patent: Jun. 11, 1996

[54] METHOD FOR COMPLETING THE TRANSFORMATION OF WASTE WATER SLUDGE INTO SPREADABLE FERTILIZER AND PRODUCT THEREBY

[75] Inventor: Wilfried P. Duske, Franklin, Wis.

[73] Assignee: Duske Design & Equipment Co., Inc., Franklin, Wis.

[21] Appl. No.: 432,332

[22] Filed: May 1, 1995

Related U.S. Application Data

[63] Continuation of Ser. No. 293,109, Aug. 19, 1994, abandoned, which is a continuation of Ser. No. 94,281, Jul. 20, 1993, abandoned.

[51] Int. Cl.$^6$ .......................... B01D 17/12; C02F 11/12; C05F 7/00
[52] U.S. Cl. .............................. 210/739; 34/136; 34/321; 34/387; 71/12; 71/903; 210/741; 210/751; 210/771; 210/774
[58] Field of Search ...................... 210/739, 741, 210/742, 751, 771, 774; 34/135, 136, 313, 314, 316, 318, 321, 384, 386, 387; 171/11, 12, 13, 14, 903

[56] References Cited

U.S. PATENT DOCUMENTS

| | | | |
|---|---|---|---|
| 2,007,298 | 7/1935 | Fasting | 34/109 |
| 3,360,868 | 12/1965 | Arnold | 34/13 |
| 3,410,233 | 11/1968 | Seiler | 110/51 |
| 3,674,216 | 7/1972 | Blair | 241/27 |
| 4,177,575 | 12/1979 | Brooks | 34/136 |
| 4,306,978 | 12/1981 | Wurtz | 210/751 |
| 4,554,002 | 11/1985 | Nicholson | 71/12 |
| 4,742,622 | 5/1988 | Thompson | 241/299 |
| 4,781,842 | 11/1988 | Nicholson | 210/751 |
| 4,902,431 | 2/1990 | Nicholson et al. | 210/751 |
| 4,997,572 | 5/1991 | Wurtz | 210/751 |
| 5,135,664 | 8/1992 | Burnham | 210/751 |
| 5,277,825 | 1/1994 | Tobler et al. | 71/12 |
| 5,302,179 | 4/1994 | Wagner | 71/12 |

OTHER PUBLICATIONS

Undated advertisement for the N–Viro soil process for converting sludge to soil, admitted prior art.
Undated advertising brochure of TCW–Technocommerce AG for changing sewage muck into fertilizer, admitted prior art.
Advertisement of Duske Design & Equipment for a single pass rotary dryer (Model SPD–500), admitted prior art.
Advertising brochure dated 1985 of Flo–Dry Technology, Ltd. for rotary dryers.
Advertising brochure of M–E–C Company for its dryer systems, including single pass dryers (p. 3), admitted prior art.
Advertising brochure of Standard Steel Coorporation for its rotary drying equipment, admitted prior art.
Letter dated Jul. 20, 1992 from Hugh J. Tobler, Chairman of the Board of Cemen Tech, Inc. to Will Duske Design & Equipment Co., Inc.

*Primary Examiner*—Joseph W. Drodge
*Attorney, Agent, or Firm*—Quarles & Brady

[57] ABSTRACT

There is disclosed a heated aeration method of completing the processing of a partially treated mixture of wastewater sludge and alkaline materials to produce a biologically active but pathogenetically clean fertilizer which can safely and easily be spread on agricultural lands. Also disclosed are a product made by the method and an apparatus for carrying out the method. The mixture is loaded into a forceful stream of heated air which carries the mixture through a rotating, internally vaned drum which has an internal, longitudinal, vaned core which rotates with the drum. The core and the vanes impart paths to the mixture particles which allow smaller particles to exit quicker than larger and thereby avoid sterilization and which breaks up larger mixture particles and otherwise enhances the spreadability of the resultant fertilizer. A vane on the core is bent and its portion beyond the bend is pronged to facilitate showering rather than dumping mixture particles.

15 Claims, 4 Drawing Sheets

METHOD FOR COMPLETING THE TRANSFORMATION OF WASTE WATER SLUDGE INTO SPREADABLE FERTILIZER AND PRODUCT THEREBY

This is a continuation of application Ser. No. 08/293,109 filed Aug. 19, 1994, now abandoned, which is a continuation of application Ser. No. 08/094,281 filed Jul. 20, 1993, now abandoned.

BACKGROUND OF THE INVENTION

1. Field of the Invention

The invention relates to the transformation of sewage sludge, septic tank pumpings, municipal wastewater sludge, manure, and other biological waste (all of which are referred to herein as "wastewater sludge") into fertilizer.

2. Description of the Art

Methods have been developed to produce a fertilizer by adding alkaline materials to wastewater sludge and further processing the resulting material so that substantially all pathogens are killed but the product is not sterilized—i.e., non-pathogenic microorganisms, which would be beneficial to soil, remain alive. Such methods are disclosed in the following United States Patents, the disclosure of each of which is hereby incorporated by reference:

| | | |
|---|---|---|
| Nicholson | 4,554,002 | Nov. 19, 1985 |
| Nicholson | 4,781,842 | Nov. 01, 1988 |
| Nicholson, et al. | 4,902,431 | Feb. 20, 1990 |
| Burnham | 5,135,664 | Aug. 04, 1992. |

The alkaline materials referred to herein include those described in the incorporated patents.

In order to produce a fertilizer which can be used economically, the foregoing methods must culminate with a sub-process which reduces the liquid content of the moist, partially treated sludge/alkaline mixture (hereinafter referred to as the "mixture") and yields an aggregate which can be easily handled and spread. In current commercial applications of the methods disclosed in these patents, this sub-process comprises windrowing the mixture and periodically turning it over a period of about six or seven days. This is done in a large building in order to protect the mixture from the elements. This sub-process is costly and time consuming.

The disclosures of the foregoing patents suggest the possibility of performing this final sub-process by heated aeration, but they do not provide details of how to do this.

A heated aeration sub-process should satisfy the following criteria:

1. To operate quickly (e.g., to operate on-line and keep up with the prior sub-processes).
2. To establish, maintain and enhance the separation of particles of the partially processed material so that the end product is easily spreadable—e.g., it is granular and has a substantially uniform moisture content.
3. To avoid sterilizing any significant part of the mixture.

The first two criteria are most easily achieved by using high temperatures and drying the product to a very low moisture content, such as, for example, 10%. However, high temperatures and a very low moisture content jeopardize the ability to meet the third criterion of non-sterilization. The sludge/alkaline mixture can be sterilized if held at a high temperature for too long or if dried excessively. Moreover, producing a product which retains enough moisture to maintain microorganisms creates a risk of clumping and clogging and therefore jeopardizes achievement of the first criterion.

SUMMARY OF THE INVENTION

The objects of the invention are to provide a heated aeration method which meets the foregoing criteria, an apparatus for carrying out the method and a product made by the method.

In one aspect, the invention provides a method of completing the treatment of a moist, partially treated mixture made of wastewater sludge and at least one alkaline material. The purpose of the treatment is to produce a drier, substantially unsterilized, spreadable fertilizer or soil supplement. There is provided a flow of heated air along a longitudinal axis. The mixture is introduced into the flow such that the flow carries mixture particles with it. The flow paths of at least some of the particles are modified by (1) allowing the flow to expand in cross section and containing the flow within an expanded boundary; (2) excluding the flow from an elongated, generally longitudinally oriented portion within the boundary; and (3) repeatedly showering particles through the flow of heated air. In some aspects, the flow particles are further modified by imparting to at least some particles a path of motion having components along, away from and at least partially around the longitudinal portion and imparting to at least some of the particles a path of motion having components along, toward and at least partially around the longitudinal portion. The dried particles are then collected into an aggregate.

In another aspect of the invention, a flow of heated air is provided along a longitudinal axis. Mixture is introduced into the flow such that the flow carries the mixture with it and contributes to the separation of the mixture into particles. The mixture-laden flow is passed into the inlet of a conduit. The conduit has a wall which defines a cross-sectional area which is larger than the original cross-sectional area of the air flow. The conduit has an outlet. In the conduit, adjacent the inlet, a closed, elongated longitudinally oriented core is provided. It prevents mixture particles from occupying an elongated portion of the conduit and diverts at least some particles toward the wall of the conduit. The conduit is rotated to impart to at least some of the mixture particles a path of motion having components along, toward and at least partially around the core. The mixture particles are collected from the outlet into an aggregate.

The invention also includes products made in accordance with the methods just described.

In a further aspect, the invention includes an apparatus for completing the treatment of a mixture as described above, in order to produce a drier, substantially unsterilized, spreadable fertilizer or soil supplement. The apparatus includes a heater and an air mover associated with it in order to establish a stream of moving heated air. A feeder discharges the mixture into the stream of moving air so that the air stream becomes laden with mixture particles. There is a drum which is rotatable about its longitudinal axis in an operating direction. The drum has an inlet in communication with the particle-laden air stream, an outlet and an inwardly extending and longitudinally oriented vane. A substantially closed, elongated, longitudinally oriented core is mounted to and within the drum so that it rotates within the drum. On the core, there is an outwardly extending and longitudinally oriented vane, the vane having a bend defining an inner portion adjacent the core and an outer portion beyond the bend, the outer portion pointing substantially counter to the operating direction of rotation and the outer portion having gaps through which mixture particles can fall.

It will be recognized that the method of the present invention substantially meets the stated criteria. One of its features is that smaller particles are heated for a shorter period than larger particles so that smaller particles are not subjected to a sterilizing time and temperature while larger particles are sufficiently dried. A further feature is that the temperatures to which the particles are subjected decrease as their moisture content decreases as the particles move through the final sub-process, thereby allowing the use of high initial temperatures without causing sterilization. Another feature is that particles are caused to move along a variety of paths which enhance separability as well as allowing more rapid passage of smaller particles.

The apparatus of the invention features a novel showering member on a vane mounted on a rotating central core. It carries mixture particles to the underside of the core and showers them in the area below the core, which otherwise tends to be underutilized.

The invention has the advantage of reducing the time and cost of performing the final sub-process in carrying out the methods disclosed in the incorporated patents.

These and other objects, features and advantages of the invention will be apparent from the description which follows. The preferred embodiments will be described in reference to the accompanying drawings. These embodiments do not represent the full scope of the invention claimed.

DESCRIPTION OF THE PREFERRED EMBODIMENTS

Figure 1:
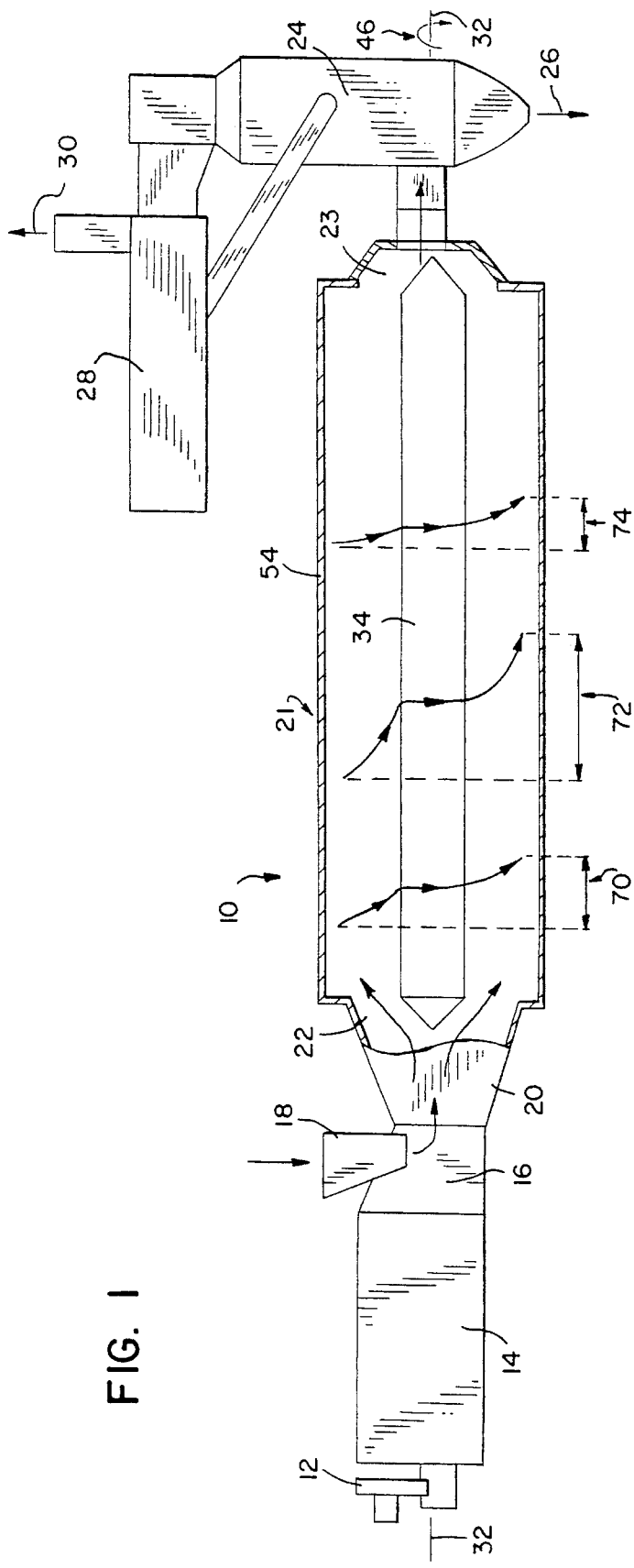
FIG. 1 is a schematic representation of an apparatus for carrying out the method of the present invention.
Figure 2:
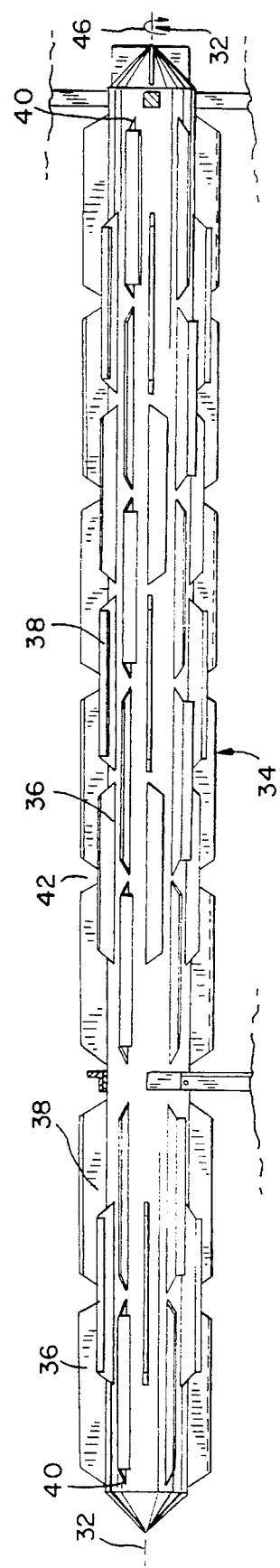
FIG. 2 illustrates a core element which contributes to the particle path modification of the claimed method.
Figure 4:
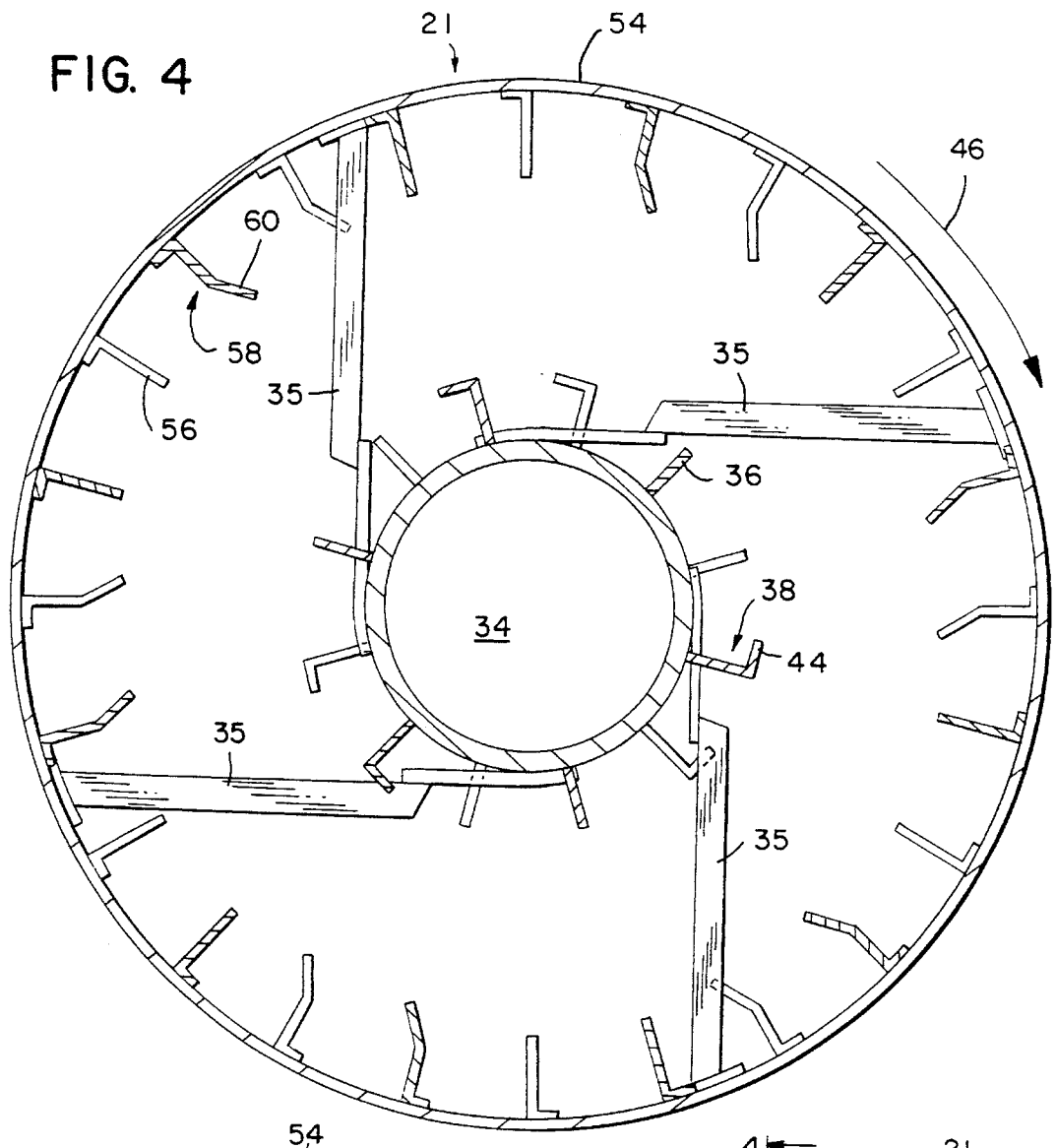
FIG. 4 is a cross-sectional view along line 4—4 of FIG. 3.
Figure 3:
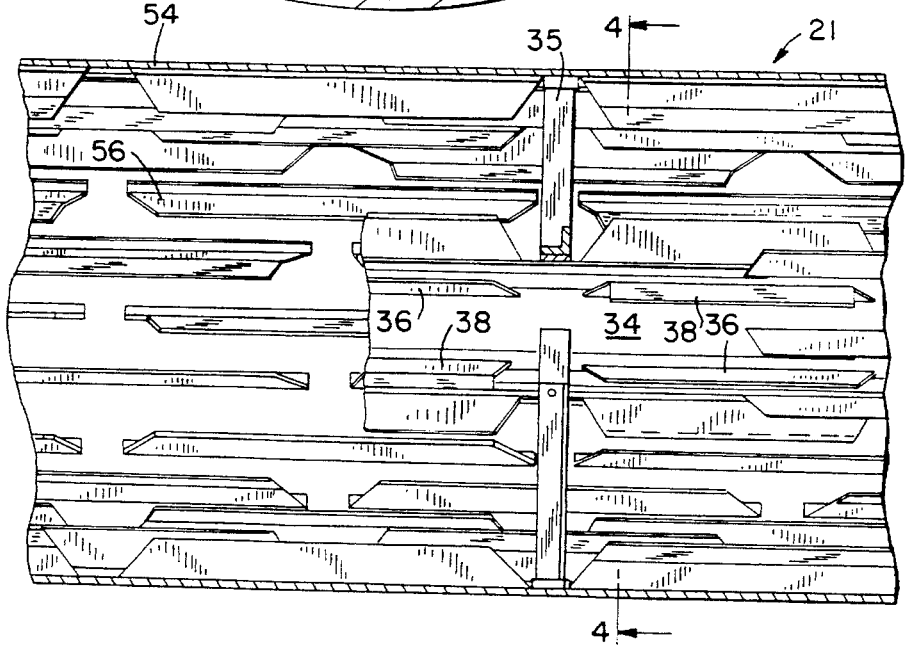
FIG. 3 is a cross-sectional view which illustrates the path-modifying vanes extending inwardly from the drum wall and outwardly from the core.
Figure 5:
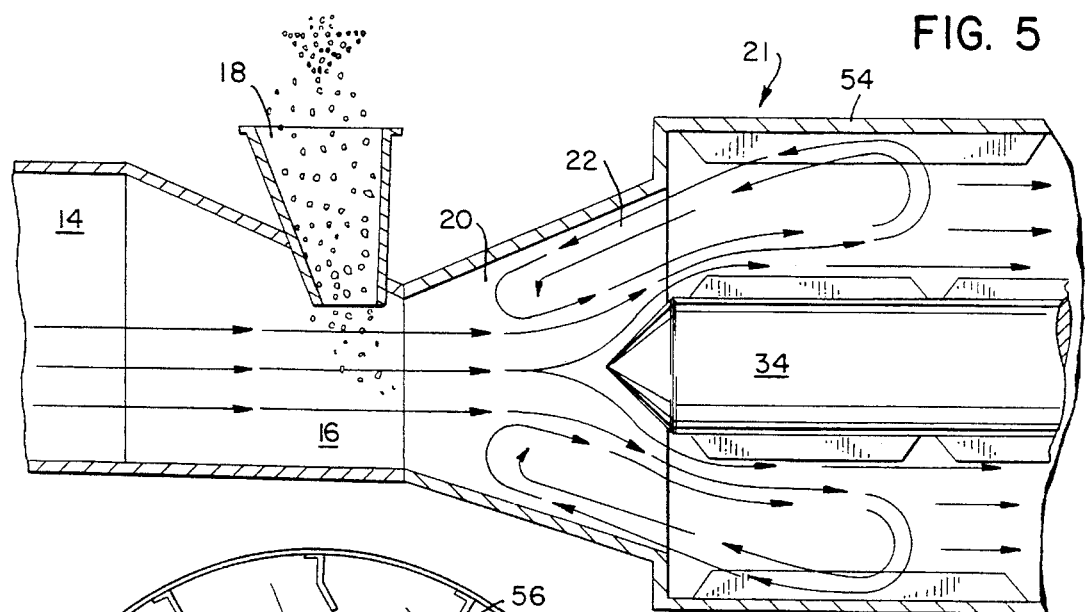
FIG. 5 is a cross-sectional, schematic view of the inlet side of the apparatus which illustrates particle flow paths at the beginning of the process.
Figure 6:
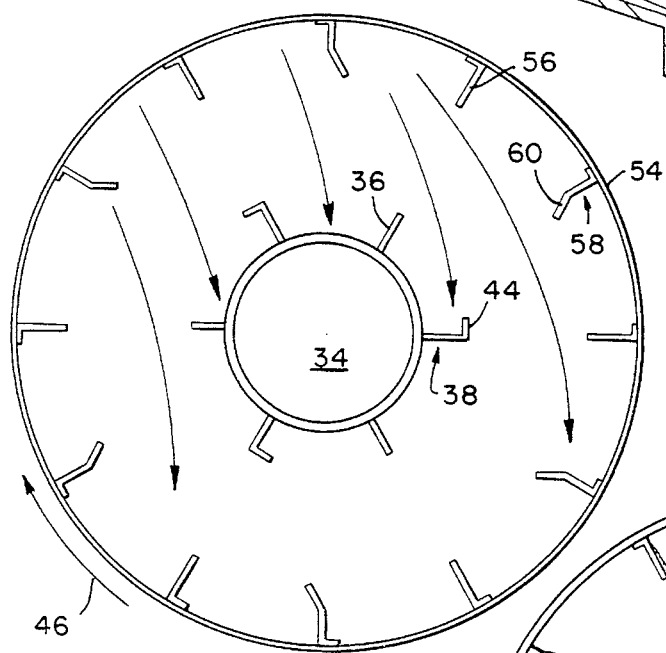
FIG. 6 illustrates the showering of particles.

FIG. 1 schematically illustrates a single pass rotary drying apparatus 10 for carrying out the method of the present invention. It includes a heater, such as a gas burner 12, which heats air supplied to an air mover 14, such as a fan (not shown), capable of producing a forceful stream of heated air. The stream of high temperature air passes through a conduit 16 which has a mixture inlet mechanism such as a feeder 18. As shown in FIG. 5, the feeder 18 deposits mixture into the air stream. Upon entering the air stream, the mixture is partially flash-dried by the high temperature and velocity of the air. However, this encounter under these conditions is brief enough to minimize sterilizing of the sludge.

The stream of heated air begins separating the mixture into particles and carries them through a conical portal 20 to a drum 21 which is rotated by an electric motor and chain drive or other conventional means (not shown). The conical portal 20 allows the flow to expand in cross section (as shown at region 22 of FIGS. 1 and 5) and thereby modifies the flow path of at least some particles of the mixture. Note, in FIG. 5, that there is a re-circulatory effect in region 22 which returns some of the partially cooled air forward and thereby moderates the temperature of the conical portal 20 and other surfaces in region 22.

The stream of heated air carries the mixture through the rotating drum 21, out of an outlet 23 and into a collector, which may include cyclone type separator 24, which, by means of an air lock (not shown), discharges (as indicated at 26) the fertilizer (the "aggregate") into a collection apparatus (not shown) and releases the exhaust gases into an air quality control device.

Figure 7:
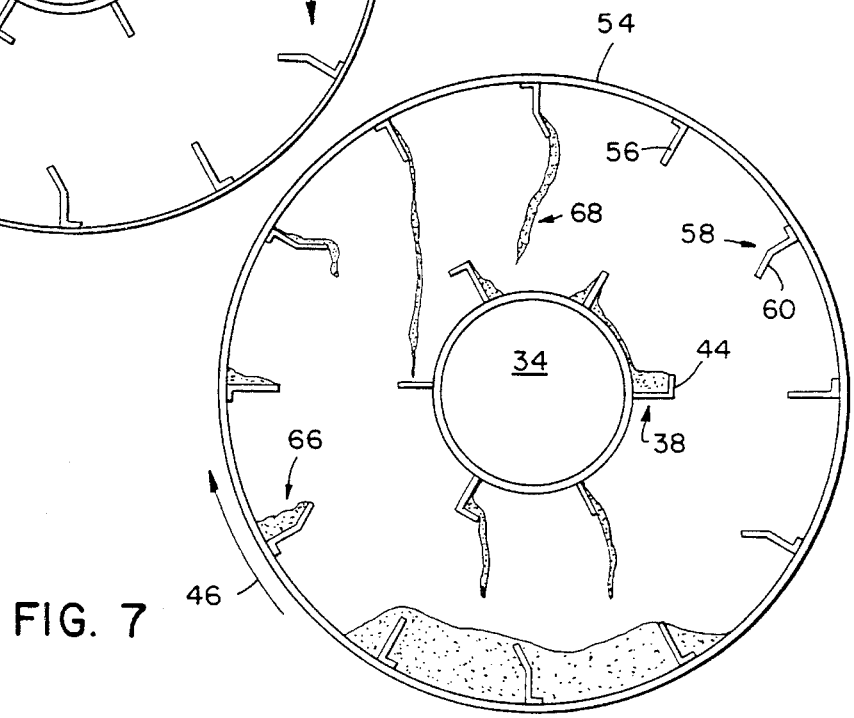
FIG. 7 is a cross-sectional schematic view of the core and drum vanes illustrating their action upon particles.
Figure 8A:
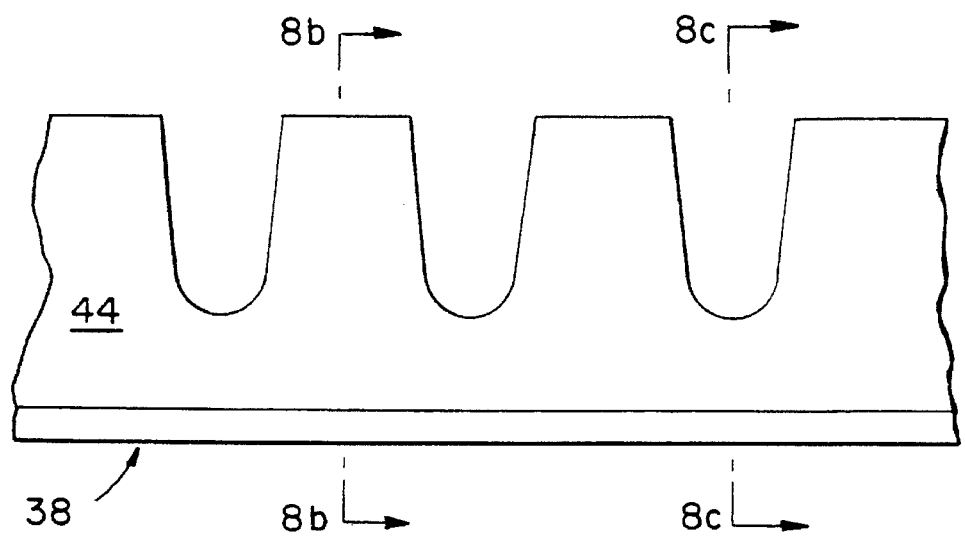
FIGS. 8a, 8b and 8c illustrate a pronged-type of drum and core vane.
Figure 8B:
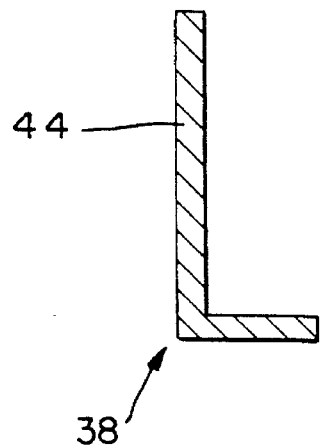
Figure 8C:
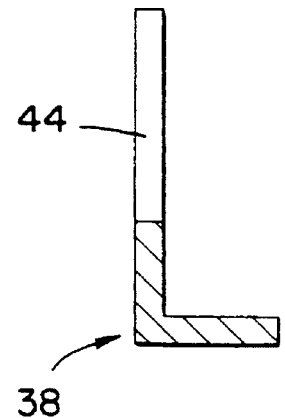

Running within the drum 21 along its longitudinal axis 32 is a closed elongated core 34. Since it is attached to the drum 21 by brackets 35 (FIG. 4), it rotates with the drum 21. Extending from the core 34 is a series of radial, longitudinally oriented vanes 36, 38 arranged in longitudinal lines (e.g., line 40). Vanes 36, 38 which are in a particular longitudinal line are separated by triangular gaps 42 which allow for thermal expansion and help dispense the flowing mixture. Some vanes 36 occupy a single plane, while others 38 are bent—e.g., into an L-shape (FIGS. 2, 3, 4, 6, 7). In the L-shaped vanes 38, the leg 44 of the L trails the direction of rotation 46 and, as shown in FIG. 7, collects particles of mixture, carries them to the underside of the core and deposits them into the air flow there, in a space that would otherwise be under utilized. The surface of a leg 44 of the L-shaped vanes 38 may be continuous so that it is shovel-like as shown in FIGS. 8b and 8c or may have a gapped surface, such as the pronged surface 44 shown in FIG. 8a. The gaps 50 between the prongs 52 facilitate a showering rather than a dumping effect and counteracts clumping tendencies of the mixture. Planar 36 and L-shaped 38 vanes alternate along each longitudinal line of vanes.

Thus, as shown particularly in FIGS. 1 and 5, the core 34 modifies particle paths by excluding the flow from the elongated, generally longitudinally oriented portion of the interior of the drum 21 and prevents short-circuited passage of drying air directly through the drum 21. In addition, the vanes 36, 38 rotating with the core 34 divert at least some particles away from and along the core 34 and impart a rotational or spiral aspect to their paths.

Extending from the inside of the wall 54 of the drum 21 is a series of lines of longitudinally oriented vanes 56, 58. Some of the vanes are planar 56 and some 58 have an obliquely offset leg 60, which leads the direction of rotation. The leg 60 may, to facilitate showering and avoid clumping, be gapped as described above for the leg 44.

The rotation of the drum 21 and the drum vanes 56, 58 imparts to at least some of the particles a path having components along, toward and at least partially around the core 34. The legs 60 of the bent drum vanes 58 act as scoops on the upswing (e.g., See 66 in FIG. 7) which shower (e.g., 68 in FIG. 7) mixture particles into the air flow above the core.

As a result of the foregoing, mixture particles, while generally in motion toward the outlet 23 of the drum 21, are repeatedly exposed transversely to the air flow, sometimes by colliding with surfaces, sometimes by showering from vanes, and sometimes by being caught and deposited by core vanes 38. Smaller and lighter particles have less lateral momentum than larger ones, and therefore the air stream moves them farther along the longitudinal axis than it moves larger or heavier particles. This is illustrated schematically in FIG. 1, in which different longitudinal advancements 70, 72, 74 are shown for particles showering from the top to the bottom of drum 21. As a result, smaller particles move through the system more rapidly than larger ones. Because of this, they have less time to be heated. This allows the initial temperature of the air flow to be higher than it could be (without causing sterilization) if the smaller particles lingered in the system as long as the larger particles.

The force of the air stream and the confrontations with the core 34, the drum 21, the core vanes 36, 38 and the drum vanes 56, 58, and the repeated falling action of the particles, cause larger particles to break up into smaller ones (which then begin moving more quickly through the system and are dried faster) and help enhance the separability of the particles, thereby resulting in a fertilizer which is more granular, easily spreadable and uniform in moisture content.

The inlet cone 16, drum 21, core 34 and vanes 36, 38, 56, 58 may be made of stainless steel, and the inlet cone 16 and drum 21 may be insulated with ceramic fiber material sandwiched between the outer shell and an inner stainless steel shell.

Conventional heater, fan and drum speed controls (not shown) are provided for varying the initial temperature of the air flow and the flow rate and varying the rate of rotation of the drum. The apparatus 10 or drum 21 may be mounted on a tilting apparatus so that the orientation of the longitudinal axis 32 can be controlled to enhance or retard mixture flow. The tilting apparatus may be adjustable jacks, a hydraulic lift or any of the tilting apparatuses known in the art. These various controls can be adjusted so that the fertilizer remains substantially unsterilized and is dried to a predetermined percentage of moisture by weight. Typically, that percentage is chosen to ensure that the fertilizer is easily spreadable and that the fertilizer is not too dry to sustain the beneficial microorganisms. In some applications, that moisture percentage is in the range of 25% to 40% moisture.

In one embodiment of the apparatus, the drum is 34 feet long and has an inner diameter of 6.5 feet; the core has a diameter of 20 inches. The operating ranges of the system components include:

| | |
|---|---|
| Drum speed | 3 to 13 RPM |
| Inlet air flow rate | 4,000 to 13,000 SCFM |
| Air temperature at inlet | 400° F. to 1400° F. |
| Outlet air flow rate | 6,000 to 16,000 SCFM |
| Air temperature at outlet | 125° F. to 225° F. |

The invention is not restricted to the embodiments described above. There may be modifications and other embodiments which are within the scope of the invention.

I claim:

1. A method of completing the treatment of a moist, partially treated mixture made of wastewater sludge and at least one alkaline material to produce a drier, substantially unsterilized, spreadable fertilizer or soil supplement, the method comprising the steps of:

(a) providing a flow of heated air along a longitudinal axis;

(b) introducing the mixture into the flow such that the flow carries mixture particles with it;

(c) modifying the flow paths of at least some of the particles by (1) allowing the flow to expand in cross section and containing the flow within an expanded boundary;

(2) excluding the flow from an elongated, generally longitudinally oriented portion within the boundary;

(3) repeatedly showering particles transversely through the flow of heated air such that the distance which any particle advances in the direction of the flow depends on its size and weight, smaller and lighter particles being advanced more than larger and heavier particles;

(d) collecting the more advanced particles into an aggregate.

2. The method of claim 1, further comprising the steps of:

imparting to at least some particles a path of motion having components along, away from and at least partially around the longitudinal portion; and imparting to at least some of the particles a path of motion having components along, toward and at least partially around the longitudinal portion.

3. The method of claim 1 in which the air is initially heated to a temperature in the range of 400° F. to 1400° F. and the initial rate of flow of the air is in the range of 1,000 to 4,000 standard cubic feet per minute.

4. The method of claim 1, further comprising the step of controlling either or both of the temperature and rate of flow of the air so that the aggregate is substantially unsterilized and has been dried to the extent that the aggregate has approximately a selected moisture content.

5. The method of claim 4, wherein the selected moisture content is low enough that the aggregate is easily spreadable and high enough to sustain microorganisms.

6. The method of claim 4, wherein the selected moisture content is in the range of 25% to 40% by weight.

7. A product made in accordance with the method of claim 1.

8. A method of completing the treatment of a moist, partially treated mixture made of wastewater sludge and at least one alkaline material to produce a drier, substantially unsterilized, spreadable fertilizer or soil supplement, the method comprising the steps of:

(a) providing a flow of heated air along a longitudinal axis, the flow having a first cross-sectional area;

(b) introducing the mixture into the flow such that the flow carries the mixture with it and contributes to the separation of the mixture into particles;

(c) passing the mixture-laden flow into the inlet of a conduit having a wall defining a second cross-sectional area larger than the first and having an outlet;

(d) providing in the conduit, adjacent the inlet, a substantially closed, elongated longitudinally oriented core of the conduit which prevents mixture particles from occupying an elongated portion of the conduit and which diverts at least some particles toward the wall of the conduit;

(e) rotating the conduit to impart to at least some of the mixture particles a path of motion having components along, toward and at least partially around the core; and then (f) collecting the particles from the outlet into an aggregate.

9. The method of claim 8, in which the air is initially heated to a temperature in the range of 400° F. to 1400° F. and the rate of air flow is initially in the range of 1,000 to 4,000 standard cubic feet per minute.

10. The method of claim 8, further comprising the step of providing the conduit with inwardly extending vanes whereby the vanes pick up particles from the lower region of the conduit, carry them to the upper region and shower them over the core and the lower region of the conduit.

11. The method of claim 8, further comprising the steps of providing the core with outwardly extending vanes and rotating the core, whereby the vanes catch showering particles and deposit them into the air flow in the lower region of the conduit.

12. The method of claim 8, further comprising the step of controlling one or more of the air temperature, air flow rate, conduit rotation speed and slope of the longitudinal axis so that the aggregate is substantially unsterilized and has been dried to the extent that the aggregate has approximately a selected moisture content.

13. The method of claim 10, wherein the selected moisture content is such that the aggregate is easily spreadable and can sustain microorganisms.

14. The method of claim 10 wherein the selected moisture content is in the range of 25% to 40% by weight.

15. A product made in accordance with the method of claim 8.